G. M. EASTERLING.
HARROW AND SEEDER.
APPLICATION FILED JUNE 6, 1912.

1,038,100.

Patented Sept. 10, 1912.

2 SHEETS—SHEET 2.

WITNESSES
Fenton S. Belt
Franklin N. Hoyt

INVENTOR
G. M. Easterling
A. L. Hoyt
Attorney

UNITED STATES PATENT OFFICE.

GEORGE M. EASTERLING, OF BLANKET, TEXAS.

HARROW AND SEEDER.

1,038,100.  Specification of Letters Patent.  Patented Sept. 10, 1912.

Application filed June 6, 1912. Serial No. 702,079.

*To all whom it may concern:*

Be it known that I, GEORGE M. EASTERLING, citizen of the United States, residing at Blanket, in the county of Brown and State of Texas, have invented certain new and useful Improvements in Harrows and Seeders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in seeder attachments for disk harrows and comprises a simple and efficient apparatus of this nature having various details of construction and combinations and arrangements of parts which will be hereinafter fully described, shown in the accompanying drawings and then specifically defined in the appended claim.

I illustrate my invention in the accompanying drawings, in which:—

Figure 1:
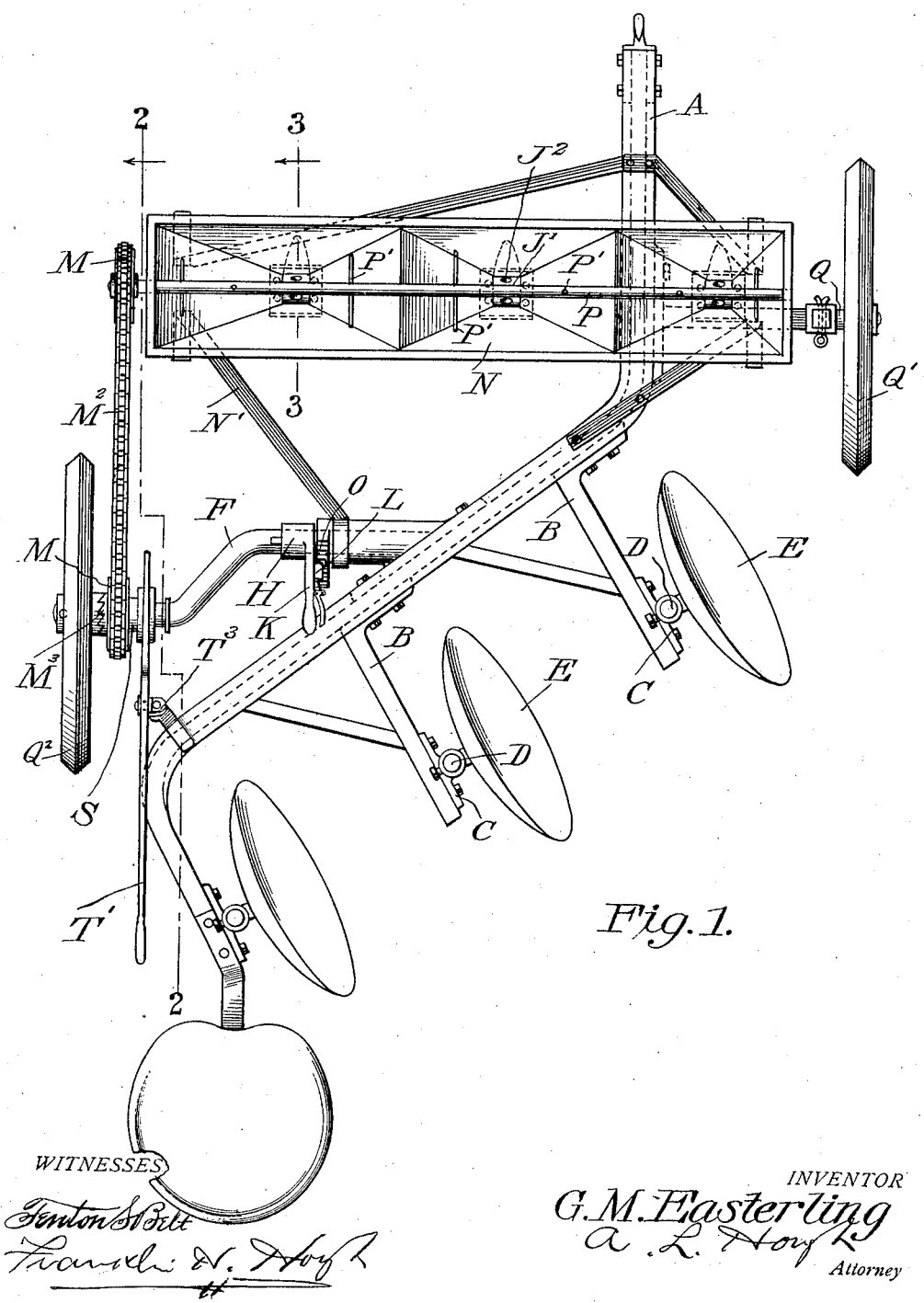
Figure 2:
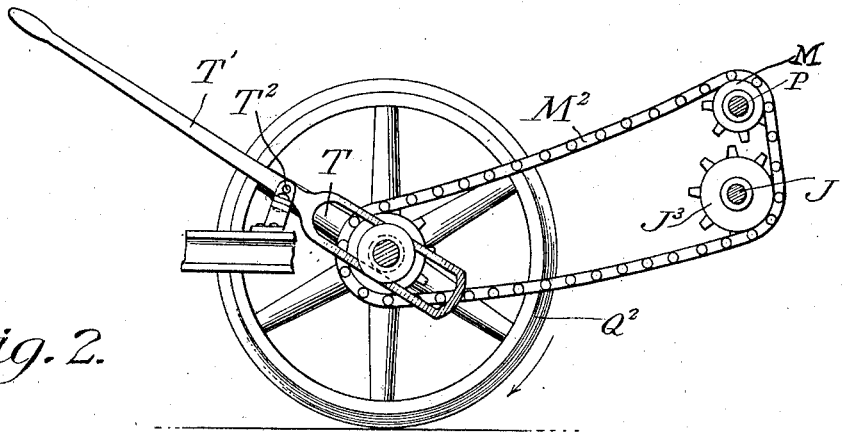
Figure 3:
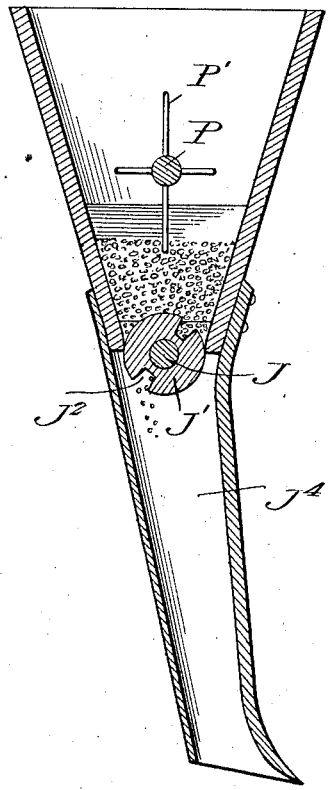

Figure 1 is a top plan view of my improved seeding apparatus and harrow. Fig. 2 is a sectional view on line 2—2 of Fig. 1, and Fig. 3 is a sectional view on line 3—3 of Fig. 1.

Reference now being had to the details of the drawings by letter, A designates the harrow beam which may be of any desirable shape and is provided with laterally extending bracket arms B, each of which carries a bearing plate C upon which the stub shaft D of a harrow disk E is journaled, said bracket arms being suitably braced, as shown in Fig. 1 of the drawings. Mounted in a suitable bearing upon said beam is an axle F which is of angular shape and fixed to said axle is a collar H, having an integral handle K projecting therefrom which carries a pawl L adapted to engage the segment teeth O upon the wall of the bearing in which the axle is mounted. A second stub axle, designated by letter Q, is connected to the harrow beam and carries a wheel Q'.

A seed box, designated by letter N, is mounted upon the frame and braces N' and divided into compartments, the walls of which are inclined, as shown clearly in Fig. 1 of the drawings, and underneath the seed box is mounted a shaft J, shown in section in Fig. 2 of the drawings, and which has a series of feeding cylinders J' fixed thereto, each mounted in an opening at the bottom of the hopper or compartment and each provided with a recess $J^2$ in its circumference in which seed is adapted to fall and which recesses deposit the seeds as the cylinder rotates with the shaft. A stirrer shaft, designated by letter P, is journaled in the ends of the box and has fingers P' projecting therefrom, affording means for agitating the seed within the hoppers or compartments of the seed box. Fixed to the shaft P is a sprocket wheel M about which and a similar wheel M' on axle F a sprocket chain $M^2$ passes. The sprocket wheel M' is fixed to a collar S'' which is provided with an annular groove adapted to receive the opposite edges of the elongated slot T formed in the shifting lever T', a detail of which is shown in Fig. 2 of the drawings, said lever T' being pivotally mounted upon a pin $T^2$ carried by the bracket member $T^3$. The sprocket wheel M' has a hub $M^3$ with teeth thereon adapted to intermesh with teeth upon the hub of the wheel $Q^2$ when it is desired to throw the stirrer and the feeding device into operation. The shaft J is provided with a sprocket wheel $J^3$ about which the chain $M^2$ passes. Positioned underneath each exit end of the hopper is a spout $J^4$ through which the seed falls to the ground.

The operation of my invention will be readily understood and is as follows:—The apparatus may be thrown into or out of gear by shifting the lever T' in one direction or the other, causing the clutch teeth to intermesh or disengage from the driving wheel $Q^2$. In the event of its being desired to raise or lower the frame for the purpose of causing the spouts to be positioned at different elevations, the operator by swinging the lever K back and forward may regulate the depth at which the spout may reach underneath the surface of the soil in depositing the seed, said disk following on behind serving to cover up the seed as it is sown. By reason of the elongated slot in the clutch throwing lever, it will be noted that the axle F may be given a slight play in said slot incident to the raising and lowering of the axle.

What I claim to be new is:—

A combined seeder and harrow comprising a frame, a harrow disk thereon, stub axles mounted upon the frame, one of said axles being of the drop type, wheels upon said axles, a clutch collar loosely mounted upon one of the axles and having clutch teeth adapted to engage teeth upon the hubs of one of said wheels, an operating lever for shifting said clutch and provided with an elongated slot allowing the drop axle to have a play therein, a lever for turning said drop axle in its bearing, and a seed dropping apparatus actuated by the clutch collar, as set forth.

In testimony whereof I hereunto affix my signature in the presence of two witnesses.

G. M. EASTERLING.

Witnesses:
PINK ANDERSON,
W. J. RICHMOND.

Copies of this patent may be obtained for five cents each, by addressing the "Commissioner of Patents, Washington, D. C."